United States Patent
Wakaki

(10) Patent No.: US 8,449,167 B2
(45) Date of Patent: May 28, 2013

(54) BACKLIGHT UNIT

(75) Inventor: Ryosuke Wakaki, Anan (JP)

(73) Assignee: Nichia Corporation, Anan-Shi (JP)

( * ) Notice: Subject to any disclaimer, the term of this patent is extended or adjusted under 35 U.S.C. 154(b) by 37 days.

(21) Appl. No.: 13/063,460

(22) PCT Filed: May 15, 2009

(86) PCT No.: PCT/JP2009/002157
§ 371 (c)(1),
(2), (4) Date: Mar. 10, 2011

(87) PCT Pub. No.: WO2010/029658
PCT Pub. Date: Mar. 18, 2010

(65) Prior Publication Data
US 2011/0164432 A1 Jul. 7, 2011

(30) Foreign Application Priority Data

Sep. 11, 2008 (JP) ................ 2008-232829

(51) Int. Cl.
*F21V 7/04* (2006.01)
(52) U.S. Cl.
USPC ......................... 362/633; 362/607
(58) Field of Classification Search
USPC ......................... 362/607, 632, 633
See application file for complete search history.

(56) References Cited

U.S. PATENT DOCUMENTS

| 6,854,856 B2 | 2/2005 | Shin et al. |
| 2003/0043310 A1 | 3/2003 | Cho |
| 2005/0122738 A1 | 6/2005 | Li et al. |
| 2005/0231658 A1 | 10/2005 | Chieh |
| 2006/0285359 A1* | 12/2006 | Yang et al. .................... 362/615 |
| 2006/0291254 A1* | 12/2006 | Jeong et al. ................... 362/632 |

FOREIGN PATENT DOCUMENTS

| JP | 2003-346533 | 12/2003 |
| JP | 2004-165031 | 6/2004 |
| JP | 2006-285161 | 10/2006 |

OTHER PUBLICATIONS

Communication (Supp EP Search Report) in EP Appln No. 09 81 2807.7 dated Jan. 24, 2012.
International Search Report in PCT/JP2009/002157 dated Aug. 25, 2009.
First Office Action Chinese Application No. 200980135690.9 dated Dec. 19, 2012.

\* cited by examiner

*Primary Examiner* — Anh Mai
*Assistant Examiner* — Andrew Coughlin
(74) *Attorney, Agent, or Firm* — Foley & Lardner LLP

(57) ABSTRACT

A backlight unit includes a lower frame comprising an opening; a light source arranged in the opening; a light guide plate arranged in the opening; and an upper frame arranged above the lower frame. The unit is so arranged that if one side of a projection (e.g., in the upper frame) is made in contact with one side of a hole (e.g. in the lower frame), then the first side end portion on the first overall end of the side surface of the upper frame is located approximately in the same plane with a first side end portion on the first overall end of the side surface of the lower frame, and the second side end portion on the second overall end of the side surface of the upper frame extends beyond the second side end portion on the second overall end of the side surface of the lower frame.

9 Claims, 4 Drawing Sheets (a)

(b)

(a)

(b)

BACKLIGHT UNIT

This application is a national stage application of PCT/JP2009/002157, filed Sep. 11, 2008, which is hereby incorporated by reference in its entirety.

DETAILED DESCRIPTION OF THE INVENTION

Technical Field of the Invention

The present invention relates to a backlight unit, and particularly to a structure of a couple of frame bodies which are engageable with each other.

TECHNICAL BACKGROUND

Generally, a backlight unit includes components, such as a light source and a light guide plate for guiding light from the light source as a planar light, housed between a lower frame and an upper frame, and the upper frame and the lower frame are engaged with each other. Such an engaging portion is described, for example, in JP 2006-285161 A, where a combination of a buckle element integrated with a part of a side surface of the upper frame and a corresponding projecting element integrated with a part of a side surface of the lower frame, and a combination of a T-shaped hook integrated with a part of a side surface of the upper frame and a groove formed in a part of a side surface of the lower frame.

DISCLOSURE OF THE INVENTION

Problem to be Solved by the Invention

However, in any of the engaging portions of the combinations described above, the width of the buckle element and the T-shaped groove are needed to be more or less larger than the width of the respective projecting element and the T-shaped hook. The larger the difference in the width between them, the more efficient the workability and the lower assembly accuracy will be, and dimensional instability of the outermost size of the backlight modules may result.

Therefore, the present invention provides a backlight unit capable of maintaining its outermost size even with an engaging structure which allows stable workability.

Means to Solve the Problem

In order to achieve the objects described above, a backlight unit of the present invention includes a lower frame defining an opening portion in its upper portion, a light source arranged in the opening portion, a light guide plate arranged in the opening portion and guiding light from the light source, and an upper frame arranged at the opening portion side of the opening portion and having a window portion capable of transmitting light from the light guide plate. The lower frame and the upper frame are engagingly fixed at a engaging portion having a projecting portion integrally arranged on a side surface of one of them and a rib portion provided with a hole portion defined in the other side surface so as to be extending from the other side surface to the one of the side surface side and to which the projecting portion can engaged with. When viewed from a side, a lower portion of the side surface of the upper frame and an upper portion of the side surface of the lower frame are in contact with each other and the width of the hole portion is larger than the width of the projecting portion. When one side end portion of the projecting portion is made in contact with one side end portion of the hole portion, the side surface of the upper frame is located approximately on the same plane with the other side end portion of the side surface of the lower frame, and the other side end portion of the upper frame is located outer side than the other side end portion of the side surface of the lower frame.

Also, it is preferable that the difference in the width between the side of the upper frame and the side of the lower frame is the same as the difference in the width between the side of the hole portion and the side of the projecting portion.

EFFECT OF THE INVENTION

The present invention provides a backlight unit capable of maintaining its outermost size of the plane even when a horizontal misalignment occurs in the fixation of the upper frame and the lower frame during assembling or transportation.

DETAILED DESCRIPTION OF THE PREFERRED EMBODIMENTS

Figure 1:
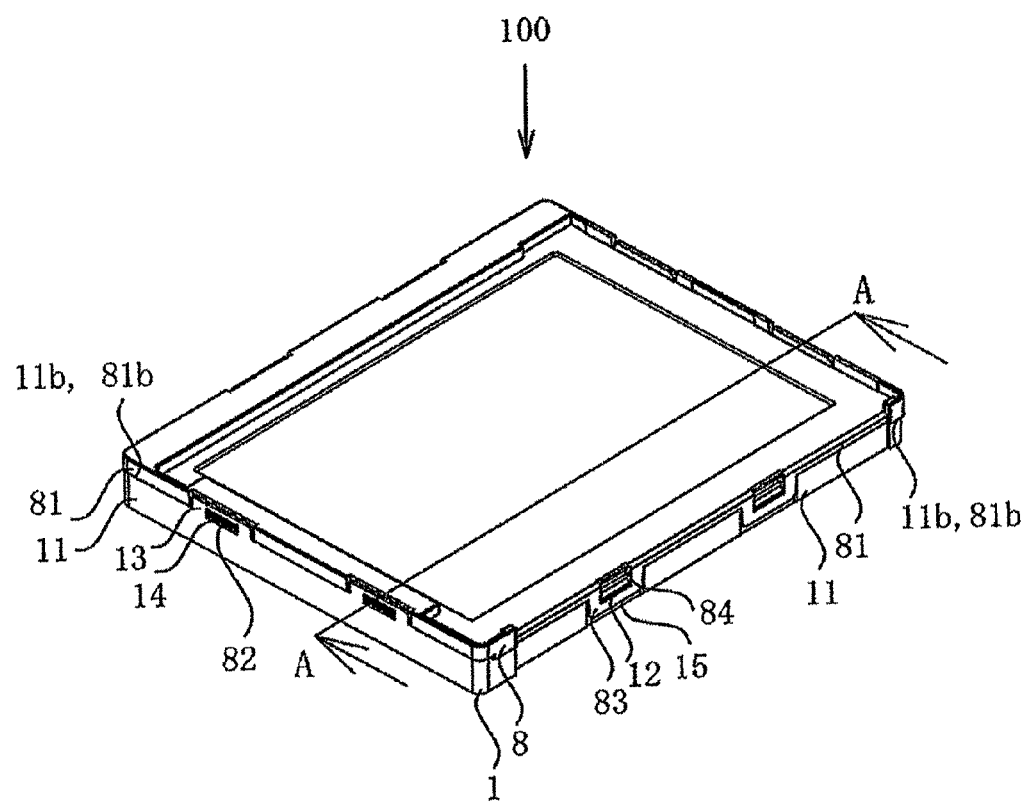
FIG. 1 is a schematic perspective view of a backlight unit of embodiment 1 of the present invention as seen from above.
Figure 2:
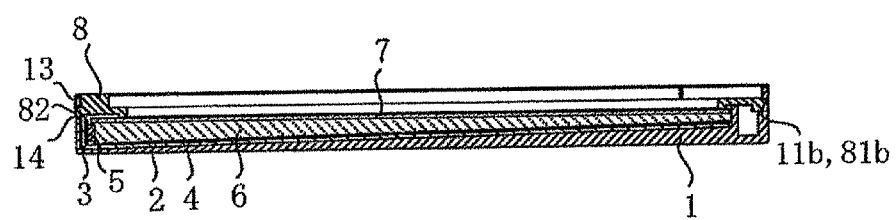
FIG. 2 is a schematic cross-sectional view taken along line A-A of FIG. 1.

FIG. 1 to FIG. 4(b) illustrate the present embodiment. FIG. 1 is a schematic perspective view seen from the planar side of the backlight unit 100 of the present embodiment. FIG. 2 is a schematic cross sectional view taken along line A-A of FIG. 1. FIGS. 3(a), 3(b), 4(a), and 4(b) are respectively a schematic longitudinal side view of the backlight 100 of the present embodiment.

The backlight unit 100 of the present embodiment is mainly formed with a light source 5, a light guide plate 6 for guiding light from the light source 5, a lower frame 1 provided with an opening portion for housing them, and an upper frame 8 configured to engage with the lower frame 1. The planar outer size of the upper frame 8 is set larger than the planar outer size of the lower frame 1. The side surface 81 of the upper frame 8 and the side surface 11 of the lower frame 1 do not cross with each other, and the lower portion 81b of the side surface 81 of the upper frame 8 and the upper portion 11b of the side surface 11 of the lower frame 1 are in contact with each other.

In the backlight unit 100 of the present embodiment, a metal plate 2 bent in an L-shape is arranged along the bottom surface and the side surface of the lower frame 1, and a light reflective sheet 4, a light guide plate 6, and an optical sheet portion 7 are stacked in this order on the planar surface of the metal plate 2, and a mounting substrate 3 having a light source 5 mounted thereon is arranged inner side of the side surface of the metal substrate 2. The structure of the backlight used in the present invention is not limited thereto, and various structures that are conventionally used for backlight units can also be used.

Light Source 5

The term "light source 5" of the present invention refers to a light emitting member capable of emitting light which can be guided in a light guide plate, examples of such light sources include a semiconductor light emitting element such as a light emitting diode and a semiconductor laser, a cold cathode tube, or a complex light source made by variously selecting and combining those listed above. In the present embodiment, a plurality of light emitting diodes 5 are arranged spaced apart from each other in the longitudinal direction of the mounting substrate 3. As an example of the arrangement of the light sources with respect to the light guide plate 6, an edge light type in which the light sources 5 are arranged at a side edge of the light guide plate 6 is described in the present embodiment, but the arrangement is not limited thereto, a directly-beneath type in which the light sources are arranged at the bottom surface side of the light guide plate may also be employed.

A mounting substrate is for mounting a light source so that the light sources can be fixed and arranged, and is provided with a conductive wiring for supplying electric power to the light sources. For example, a mounting substrate can be preferably formed with a glass epoxy substrate or a flexible substrate which is provided with a conductive pattern made of a copper foil and the like, or a metal body combined with an insulating resin. The mounting substrate can be made with high heat releasing property, where a conductive wiring is provided to a metal material made of aluminum, copper, or the like, through an insulating material. In addition, it is preferable that the mounting substrate is adhesively arranged to a casing through a member having good heat conductivity such as heat releasing sheet.

Light Guide Plate 6

A light guide plate 6 is a light transmitting member having a light incident surface, a light reflecting surface, and a light emitting surface, in which the light entered from the light incident surface is guided by the light reflecting surface and is emitted from a predetermined light emitting surface in a desired shape. Therefore, the light emitting surface of the light guide plate can be formed in various shapes according to its application, such as a needle-shape on a meter and a shape for a backlight light source for liquid crystal display. The light guide plate 6 has a light transmitting property in order to emit light efficiently from the light sources 5 from the light emitting surface. Examples of preferable materials of such a light guide plate 6 include various materials such as acrylic resins, a polycarbonate resins, and glass.

An optical sheet portion 7 is arranged at the light emitting surface of the light guide plate 6. The optical sheet portion 7 of the present embodiment includes a diffusion sheet, a prism lens sheet, and a polarizing sheet, which are stacked in this order on the light emitting surface side of the light guide plate 6. Those optical sheets have a shape corresponding to the size and shape of the light emitting surface of the light guide plate. The optical sheet portion is not limited thereto, and may have a stacked-layer structure formed with the layers which are variously selected from diffusion sheets, prism lens sheets, or the like. In view of the optical properties of the backlight unit, the number of each sheet and the sequence of stacking such sheets in the optical sheet portion are adjusted.

Also, a light reflecting sheet 4 is arranged on the light reflecting surface side which is opposite side of the light emitting portion of the light guide plate 6. The light reflecting sheet is required to have high optical reflectivity, so that a white PET material or a material having a metal coating on its surface is preferably used. The metal plate is a member for releasing heat, which is generated from the light sources arranged at an inner side, from the bottom surface side of the lower frame, and aluminum is preferably used.

Lower Frame 1

The lower frame 1 of the present embodiment has an approximately rectangular flat surface and side surfaces, and defining an opening portion at approximately center of its upper portion so as to house the light sources 5 and the light guide plate 6.

Each of the opposing pair of longitudinal side surfaces of the lower frame 1 defines a plurality of first recess portions at designated positions in the outer side surface, and first projecting portions 12, each having a short side surface of a trapezoidal shape so as to be fit in the corresponding each first recess portion, are integrally formed with the lower frame 1. Further, each of the pair of opposite short side surfaces of the lower frame 1 has a plurality of first rib portions 13 each having a longitudinal side surface of an approximately rectangular shape and extending from the top edge portion toward the upper frame 8, and a first hole portion 14 penetrating from outside to inside is defined in the first rib portion 13.

The material of the lower frame is not specifically limited and metal materials and resin materials which are conventionally employed can also be used. Particularly, a resin material is preferably used in view of mechanical strength and processing, where resin materials containing various light diffusing agents are preferable. The size and shape of the lower frame 11 can be variously selected according to the sizes and shapes of the light sources 5 and the light guide plate 6 which are to be housed. A Polycarbonate resin having excellent shock resistance and weather resistance is preferably used as the material for the lower frame 11. In the case where a resin material is used for the lower frame, it is preferable to provide a hole portion (not shown) in the bottom surface, to enhance release of the heat generated by the light sources 5 arranged inside the frame.

Upper Frame 8

The upper frame 8 of the present embodiment has an approximately rectangular flat surface and side surfaces. The flat surface of the upper frame 8 defines a window portion in the center so as to extract light from the backlight. The size and shape of the upper frame 8 can be variously selected according to the size and shape of the lower frame 1, provided that the external size of the flat surface of the upper frame 8 is larger than the external size of the flat surface of the lower frame 1. The material for the upper frame 8 preferably has greater plasticity than the material for the lower frame 1, in order to mount a display panel on its upper portion.

A second rib portion 83 is integrally formed with each of the opposing pair of longitudinal side surfaces of the upper frame 8. The second rib portion 83 having a longitudinal side surface of an approximately rectangular shape is formed extending from the lower end portion of the upper frame 8 toward the first recess portion 15 of the lower frame 1. The second rib portion 83 defines a second hole portion 84 penetrating from outside to inside, to which the first projecting portion 12 of the lower frame can be engaged. Further, at each of the pair of opposite short side surfaces of the upper frame 8, a second recess portion is defined in the outer surface at a position facing the first rib portion 13 of the lower frame 1, and a second projecting portion 82 having a short side surface of a trapezoidal shape and capable of engaging with the first hole portion 14 of the lower frame 1 is integrally formed in the second recess portion. When viewed from side, the width of the first hole portion 14 and the second hole portion 84 is larger than the width of the second projecting portion 82 and the first projecting portion 12 respectively.

Engaging Portion

As described above, the backlight unit 100 of the present embodiment has an engaging portion at respective side surfaces 11, 81 of the lower frame 1 and the upper frame 8. In the backlight unit 100 of the present embodiment, the upper portion 11b of the side surface 11 of the lower frame 1 and the lower portion 81b of the side surface 81 of the upper frame 8 are in contact with each other and locate on the same plane, with each of the rib portions 13, 83 and each of the projecting portions 12, 82 are housed in each of the respective recess portions 85, 15. Accordingly, a backlight unit of small size in its flat surface and light weight can be obtained. The number and shape of the engaging portions and their locations of the present invention are not limited with that have shown in the present embodiment, as long as the lower frame 1 and the upper frame 8 are engaged and fixed with each other.

FIGS. 3(a), 3(b), 4(a), and 4(b), respectively, are schematic longitudinal side views of a backlight 100 of the embodiment 1. FIG. 3(a) is a schematic side view showing a one side end portion 12a of the first projecting portion 12 provided on the side surface 11 of the lower frame 1, where the one side end portion 12a is in contact with one side end edge portion 84a of the second hole portion 84 provided in the second rib portion extending from the side surface 81 of the upper frame 8 to which the first projecting portion 12 is engaged with. FIG. 3(b) is a magnified view of the portion encircled with dotted line in FIG. 3(a). FIG. 4(a) is a schematic side view showing another side end portion 12a' of the first projecting portion 12 provided on the side surface 11 of the lower frame 1, where the another side end portion 12a' is in contact with another end edge portion 84a' of the second hole portion 84 provided in the second rib portion extending from the side surface 81 of the upper frame 8 to which the first projecting portion 12 is engaged with. FIG. 4(b) is a magnified view of the portion encircled with dotted line in FIG. 4(a).

Figure 3:
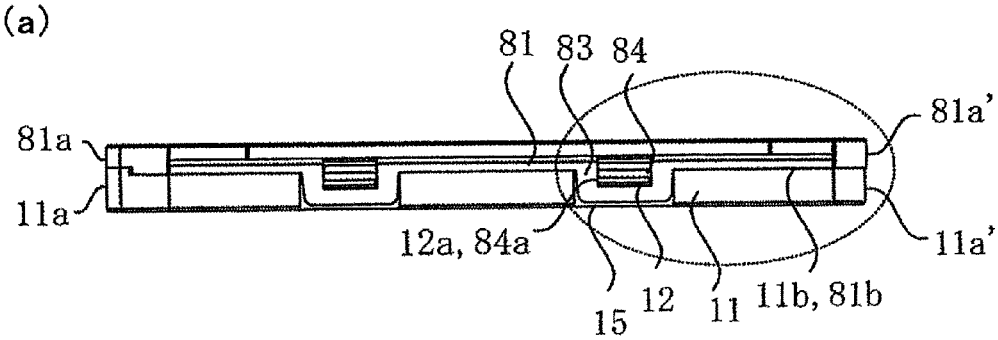
FIG. 3 is a schematic side view of a backlight unit of embodiment 1 of the present invention.
Figure 3:
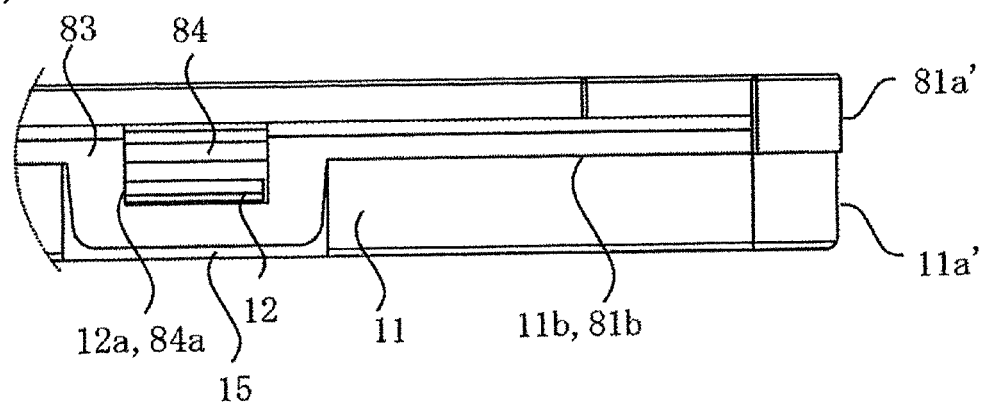

As shown in FIG. 3, the one side end portion 81a of the side surface 81 of the upper frame is located on approximately the same plane as the one side end portion 11a of the side surface 11 of the lower frame 1, and another side end portion 81a' of the side surface 81 of the upper frame 8 is located at an outer side than another side end portion 11a' of the side surface 11 of the lower frame 1. With setting each of the frames and their respective engaging positions as described above, the outermost size of the plane can be maintained constant even when a horizontal misalignment occurs at the engaging portion of the upper frame and the lower frame. In the present specification, the expression "the one side end portion of the side surface of the upper frame is located on approximately the same plane as the one side end portion of the side surface of the lower frame" means a difference in the outermost location between the one side end portion of each of the side surfaces is 0.1 mm or less.

Figure 4:
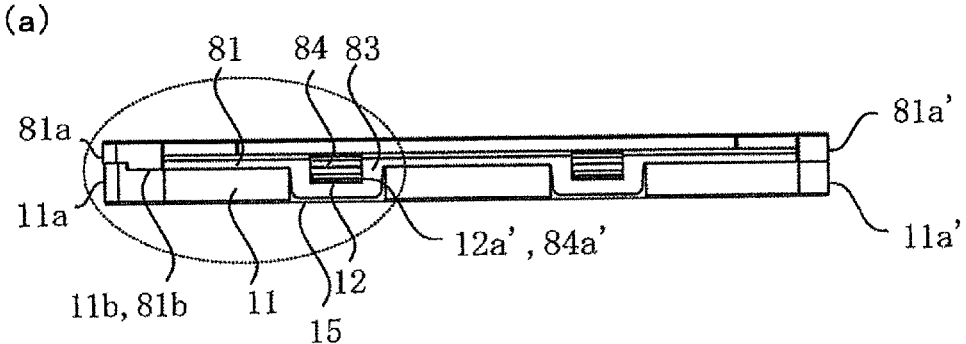
FIG. 4 is a schematic side view of a backlight unit of embodiment 1 of the present invention.
Figure 4:
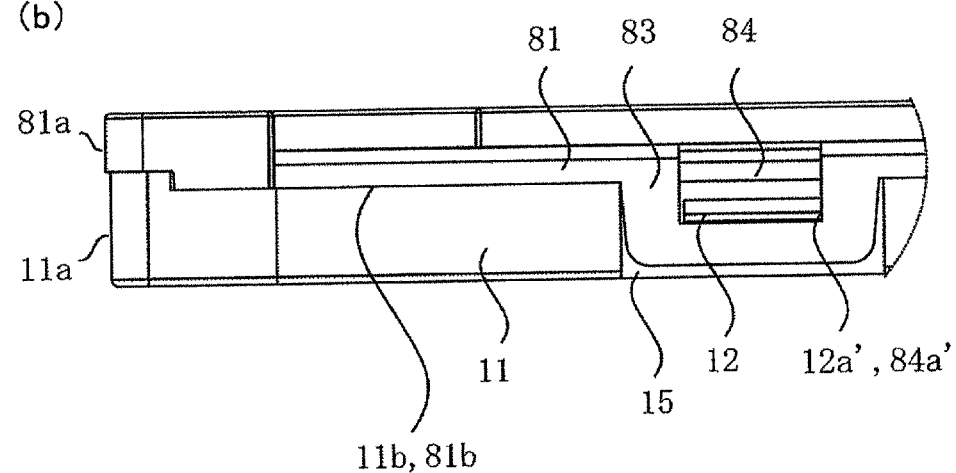

Further, in the present embodiment, the difference in the width between the side surface of the upper frame and the side surface of the lower frame is set to the same as the difference in the width between each of the respective hole portions and projecting portions. With this arrangement, as shown in FIG. 4, in the condition where another side end portion 12a' of the first projecting portion 12 provided on the side surface 11 of the lower frame 1, where another side end portion 12a' is in contact with another end edge portion 84a' of the second hole portion 84 provided in the second rib portion extending from the side surface 81 of the upper frame 8 to which the first projecting portion 12 is engaged with, another end portion 81a' of the side surface 81 of the upper frame is located on approximately the same plane as another end portion 11a' of the side surface 11 of the lower frame 1.

With setting each of the frames and their respective engaging positions as described above, a backlight of small-size and light-weight type can be obtained in which the outermost size of the plane can be maintained constant even when a horizontal misalignment occurs at the engaging portion of the upper frame and the lower frame.

In the present embodiment, the width of each hole is 3.8 mm, the width of each projecting portion is 3.6 mm, the longitudinal width of the upper frame is 80 mm, and the longitudinal width of the lower frame is 79.8 mm.

The difference in the longitudinal width between the upper frame and the lower frame can be adjusted according to the application. For example, a liquid crystal display device, in which a liquid crystal panel is fixed at the upper surface of a backlight unit designed to have a large difference in the longitudinal width between the upper frame and the lower frame, has a large step on the side surface. Therefore, assembly can be facilitated in a case where the liquid crystal display device is inserted straight and fixed in a front panel.

INDUSTRIAL APPLICABILITY

The backlight according to the present invention can be used, for example, in an in-vehicle liquid crystal display device, as a backlight which is resistant to vibration or the like and is of thin, light weight, and low electric consumption type.

What is claimed is:

1. A backlight unit comprising:
   a lower frame comprising an opening in its upper part;
   a light source arranged in the opening;
   a light guide plate arranged in the opening for guiding light from the light source; and
   an upper frame arranged above the lower frame and having a window capable of transmitting light from the light guide plate;
   the lower frame and the upper frame being engagingly fixable by a projection integrally arranged on a side surface of one of the frames, and a rib portion on a side surface of the respective other frame the rib portion defining a hole with which the projection can be engaged;
   wherein a lower portion of a side surface of the upper frame and an upper portion of a side surface of the lower frame are in contact with each other and a width of the hole is larger than a width of the corresponding projection,
   wherein the upper frame has a first side end portion on a first overall end of the side surface of the upper frame and a second side end portion on a second, opposite overall end of the side surface of the upper frame, and
   wherein the lower frame has a first side end portion on a first overall end of the side surface of the lower frame and a second side end portion on a second, opposite overall end of the side surface of the lower frame, and
   the unit is so arranged that if one side of the projection is made in contact with one side of the hole, then the first side end portion on the first overall end of the side surface of the upper frame is located approximately in the same plane with a first side end portion on the first overall end of the side surface of the lower frame, and the second side end portion on the second overall end of the side surface of the upper frame extends beyond the second side end portion on the second overall end of the side surface of the lower frame.

2. The backlight unit according to claim 1, wherein a difference between a side width of the upper frame and a side width of the lower frame is the same as a difference between a side width of the hole and a side width of the projection.

3. The backlight unit of claim 1, wherein the light guide plate comprises at least one of the following materials: an acrylic resin, a polycarbonate resin, or glass.

4. The backlight unit of claim 1, wherein the light guide plate comprises an optical sheet portion on a light emitting surface side, the optical sheet portion comprising a diffusion sheet, a prism lens sheet, and a polarizing sheet, stacked in this order.

5. The backlight unit of claim 1, wherein the light guide plate comprises a light-reflecting sheet on a light reflecting surface side, the reflecting sheet having a high optical reflectivity and comprising at least one of a white PET material or a material having a metal coating on a surface.

6. The backlight unit of claim 1, wherein the lower frame comprises a polycarbonate resin, and wherein the lower frame further comprises a bottom surface having an a hole portion.

7. The backlight unit of claim 1, wherein the upper frame comprises a first material and the lower frame comprises a second material, and the plasticity of the first material is greater than the plasticity of the second material.

8. The backlight unit of claim 1, wherein a difference between an outermost location of the first side end portion on the first overall end of the side surface of the upper frame and an outermost location of the first side end portion on the first overall end of the side surface of the lower frame is 0.1 mm or less.

9. The backlight unit of claim 1, wherein a difference between a width of the upper frame and a width of the lower frame is the same as a difference between a width of the hole and a width of the projection.

* * * * *